UNITED STATES PATENT OFFICE.

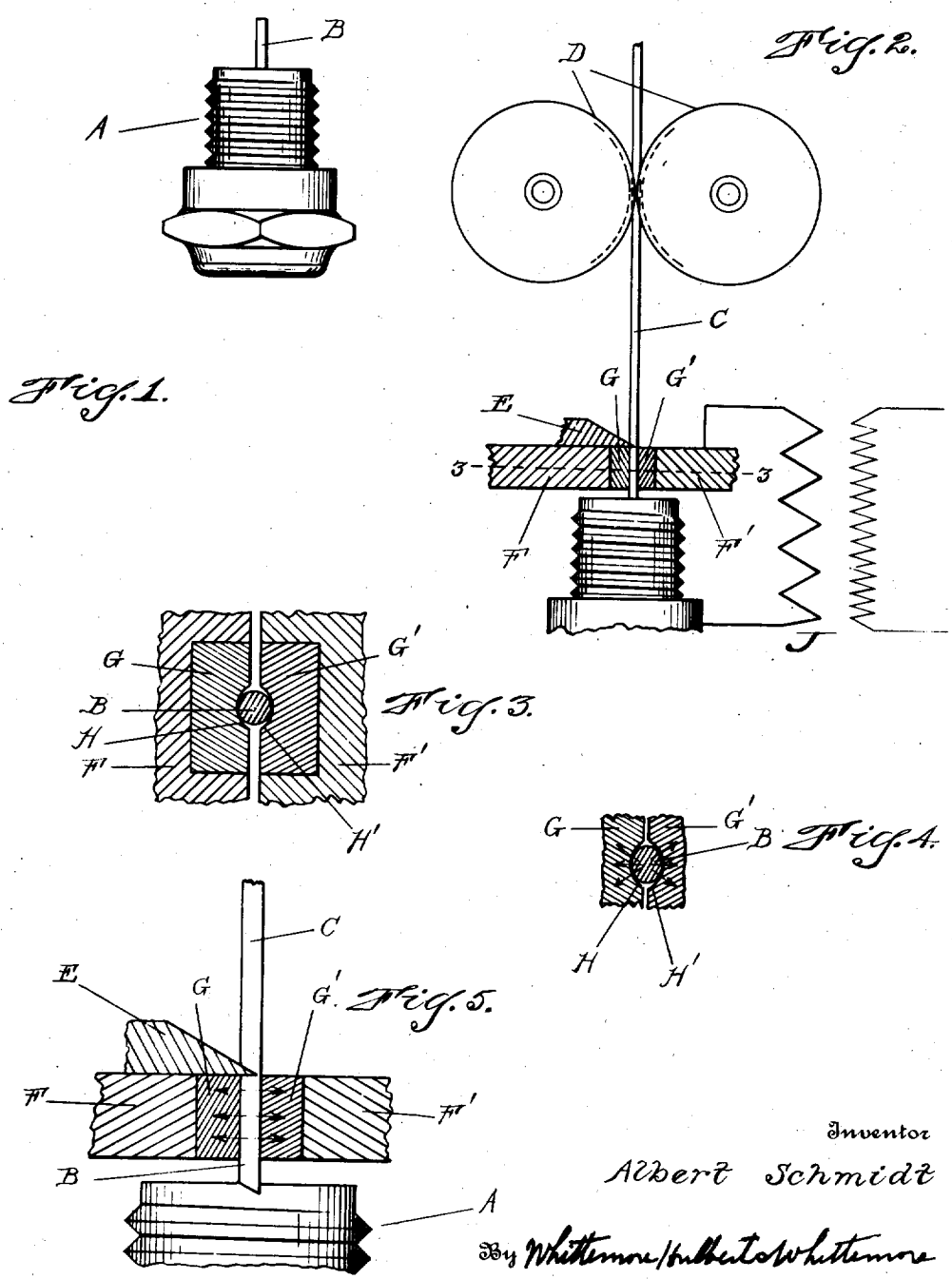

ALBERT SCHMIDT, OF FLINT, MICHIGAN, ASSIGNOR TO CHAMPION IGNITION COMPANY, OF FLINT, MICHIGAN, A CORPORATION OF MICHIGAN.

METHOD OF ELECTRICALLY WELDING.

1,340,412.  Specification of Letters Patent.  Patented May 18, 1920.

Application filed July 26, 1918. Serial No. 246,808.

*To all whom it may concern:*

Be it known that I, ALBERT SCHMIDT, a citizen of the Republic of France, residing at Flint, in the county of Genesee and State of Michigan, have invented certain new and useful Improvements in Methods of Electrically Welding, of which the following is a specification, reference being had therein to the accompanying drawings.

The invention relates to the art of electrical welding and it is the object of the invention to facilitate the welding together of elements greatly varying in mass. Specifically it is an object to electrically weld electrodes to spark plug casings, but the invention is clearly applicable to many other uses. In the present state of the art electrical welding is easily effected between members which are approximately of the same size adjacent to the weld, but where one element is of much greater mass than the other, difficulty is encountered. This is due to the fact that the smaller element will be overheated and possibly fused before the metal in the abutting element of larger mass is raised to the welding temperature. The overheating of the smaller element is partly due to its greater electrical resistance and consequent greater generation of heat, but chiefly it is due to the relatively slow dissipation of heat therefrom. On the other hand, the heat generated in or conducted to the element of greater mass is very rapidly dissipated and therefore the temperature can not rise to a welding point before the overheating or fusion of the smaller element.

To overcome this difficulty I have devised a method of dissipating the heat from the smaller element so as to equalize the temperature thereof to that of the larger element at the abutting point. I have also devised a method by which successive welds may be rapidly performed and without the requirement of a high degree of skill on the part of the workman.

In the drawings:

Figure 1 is an elevation of a spark plug casing with an electrode welded thereto by my improved method;

Fig. 2 is a sectional elevation illustrating the method of the welding;

Fig. 3 is a cross-section on the line 3—3 of Fig. 2 showing the clamping jaws engaged with the work but before the application of pressure;

Fig. 4 is a similar view when the jaws are pressed together;

Fig. 5 is an enlarged view of a portion of Fig. 2 showing the manner of pressing two members to be welded in contact with each other.

In the manufacture of spark plugs it is usual to form a grounded electrode of wire formed of high fusing material such as nickel or nickel alloy. This electrode is usually attached to the spark plug casing by drilling a hole in the annular wall of the casing and inserting the end of the wire thereinto. This operation is difficult and expensive, due to the time and skill required and also to the fact that the drills are frequently broken. Furthermore, the electrode when inserted in the hole in the casing, is not in molecular contact with the metal of the casing, which interferes both with the electrical and thermal conductivity inasmuch as the electrode is subjected to very high temperature and the heat can only be dissipated through conduction into the casing. It is evident that good thermal conductivity is of the greatest importance.

The welding of an electrode to its casing has heretofore been thought impracticable by reason of the small diameter of the wire and the comparatively large mass of the metal casing. Attempts to dissipate the heat from the wire have heretofore been unsuccessful due to the small amount of surface exposure and the difficulty of forming heat conducting contacts therewith. Even where the wire is clamped in material of the highest thermal conductivity such, for instance, as silver, there is still difficulty in dissipating the heat with sufficient rapidity to equalize the temperature of the electrode with that of the casing at the point of contact. I have discovered that by applying high pressure to the work from a contacting surface of greater hardness, the thermal conductivity is greatly increased even where the materials used have not a high coefficient of conductivity. I have further discovered that by applying high initial pressure to the contacting members to be welded the temperature in the element of smaller mass will be reduced by thermal conduction to the element of greater mass. As a consequence of these discoveries, I am able to successfully weld an electrode to a spark plug casing and perform similar operations upon other elements varying in mass.

As shown in Fig. 1, A is the body of the spark plug casing of any suitable construction, and B is the electrode to be welded thereto. This electrode is preferably cut from a continuous wire C, which may be fed to the welder by suitable means such as the feed rolls D, and cut off by a shear E. F and F' are clamping jaws for engaging and holding the electrode during the welding operation and which form electrode and thermal contact therewith. These jaws are preferably formed of harder material than that used for the electrode or other work, and where nickel or nickel alloy is used for the electrode I preferably employ tungsten for forming the jaws. As shown, G and G' are tungsten inserts in the body of the jaws, these inserts being formed with grooves H and H' for embracing the electrode. As shown in Figs. 3 and 4, the clamping of the work by the jaws produces a deformation of the surface of the softer material so as to conform the same exactly to the harder surface and to produce in effect molecular contact therewith. Furthermore, the pressure applied is sufficient to squeeze out any intervening film of material which might interfere with the conductivity. The jaws are preferably extended the entire length of the electrode from the point where it is sheared from the wire C to near the opposite end. There is, however, a projecting portion of sufficient length to avoid any short circuiting between the jaws and the spark plug casing and also to provide for the necessary upsetting incidental to the forming of the weld.

In operation, the wire C is first fed through the separated jaws F and F' and is then clamped by pressure of said jaws, the shear blade E being also engaged but preferably not completely severing the wire at the start. The casing A is then moved into contact with the projecting end of the electrode and with sufficient pressure to form a slight deformation of the contacting surfaces assuring good conductivity therebetween. The electrical current from a transformer, or other source of supply as indicated at J, is then turned on and continued until the metal at the point of contact is raised to the welding temperature. During this interval heat is rapidly conducted from the electrode into the jaws F and F' and also into the casing A. Consequently, the temperature will rise uniformly on each side of the joint and in predetermined time interval the weld will be effected. The current is then cut out and the continuing dissipation of heat will quickly set the weld. The shear E is then actuated to completely sever the electrode from the wire C after which the jaws are separated and the electrode removed.

My improved method is one particularly adapted for use in automatic welding machines inasmuch as the variables are largely eliminated and the successive operations may therefore be performed by timed mechanism.

What I claim as my invention is:

1. In the method of electrically welding, the step of applying pressure to the work by a contacting body sufficient to produce a deformation in the surfaces of the work contacting with the pressure applying body.

2. In the method of electrically welding, the step of increasing the thermal conductivity between an element of the work and a contacting body by pressure sufficient to deform the surfaces of the work contacting with the body.

3. In the method of electrically welding elements of different mass, the step of applying to the smaller element pressure from a contacting body of larger mass sufficient to substantially equalize the heat dissipation from the smaller and larger elements.

4. In the method of electrically welding elements of different mass, the step of applying to the smaller element pressure from a contacting body of larger mass and greater surface hardness sufficient to produce uniform thermal conductivity in successive operations.

5. The method of electrically welding, comprising the intermittent feeding of stock for the smaller element, clamping the projecting portion of said stock with sufficient pressure to produce uniform thermal conductivity in successive operations, contacting and applying pressure between the clamped stock and the coöperating element to be welded thereto, passing an electrical current through the elements to effect the heating and welding thereof, and severing the clamped portion from the remainder of the stock and releasing the clamp.

6. In the method of electrically welding elements of different mass, the step of applying means to substantially equalize the heat dissipation from the smaller and larger elements.

7. In the method of electrically welding elements having varying heat conducting capabilities, the step of utilizing means tending to balance said varying capabilities.

8. The method of electrically welding, comprising the pinching of one element by a shearing member, forcing said element into contact with the second element and coincidentally passing an electric current therethrough for a predetermined period of time, and finally finishing the shearing of said first element.

9. The method of electrically welding, comprising the pinching of one element by a shearing member, forcing said element into contact with the second element, coincidentally passing an electric current therethrough for a predetermined period of time, finishing the shearing of said first element, and retaining said elements in position after the cutting out of the current until sufficient heat is dissipated from the point of contact between said elements to solidify the metal.

In testimony whereof I affix my signature.

ALBERT SCHMIDT.